United States Patent
Peralta

(10) Patent No.: US 12,031,194 B2
(45) Date of Patent: Jul. 9, 2024

(54) PROCESS FOR EXTRACTING COBALT FROM A SOLUTION COMPRISING, IN ADDITION TO COBALT, ONE OR MORE OTHER METAL ELEMENTS

(71) Applicant: COMMISSARIAT À L'ÉNERGIE ATOMIQUE ET AUX ÉNERGIES ALTERNATIVES, Paris (FR)

(72) Inventor: David Peralta, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 748 days.

(21) Appl. No.: 17/251,884

(22) PCT Filed: Jun. 18, 2019

(86) PCT No.: PCT/FR2019/051483
§ 371 (c)(1),
(2) Date: Dec. 14, 2020

(87) PCT Pub. No.: WO2019/243728
PCT Pub. Date: Dec. 26, 2019

(65) Prior Publication Data
US 2021/0254192 A1     Aug. 19, 2021

(30) Foreign Application Priority Data

Jun. 18, 2018 (FR) ........................ 1855348

(51) Int. Cl.
*C22B 3/00*     (2006.01)
*C22B 3/44*     (2006.01)

(52) U.S. Cl.
CPC ............ *C22B 23/0461* (2013.01); *C22B 3/44* (2013.01)

(58) Field of Classification Search
CPC .............................. C22B 23/0461; C22B 3/44
See application file for complete search history.

(56) References Cited

U.S. PATENT DOCUMENTS

| | | | | |
|---|---|---|---|---|
| 4,039,612 A | * | 8/1977 | Price | ................... C22B 15/0089 |
| | | | | 423/100 |
| 4,039,621 A | * | 8/1977 | Costantini | .............. B01D 53/48 |
| | | | | 423/239.1 |
| 4,254,087 A | | 3/1981 | Grinstead | |

FOREIGN PATENT DOCUMENTS

FR     2462182 A1     2/1981

OTHER PUBLICATIONS

Okewole et al., Hydrometallurgy, (2012), v.121-124, p. 81-89.*
Morizono, Hirofumi et al :"Liquid-liquid extraction of transition metal ions with an alkyhistidine extractant" Separation and purification Technology, Elsevier Science, Amsterdam NL, vol. 80, No. 2, May 23, 2011, pp. 390-395.
Perez, Emilie et al: "In-situ precipitation of Metal-Organic Frameworks from a simulant battery waste solution", Materials Letters, Elsevier, Amsterdam NL, vol. 167, Dec. 29, 2015, pp. 188-191.
International Search Report for PCT/FR2019/051483 dated Sep. 30, 2019.
Written Opinion for PCT/FR2019/051483 dated Sep. 30, 2019.
Search report for French application No. FR1855348 dated Feb. 6, 2019.

* cited by examiner

*Primary Examiner* — Yong L Chu
(74) *Attorney, Agent, or Firm* — Pearne & Gordon LLP

(57) ABSTRACT

A process for selectively extracting cobalt from a composition comprising cobalt and one or more other metal elements, wherein the process comprises the following steps: a) a step of forming a precipitate consisting of a coordination complex comprising cobalt, by bringing the solution into contact with at least one aromatic compound comprising at least two nitrogen atoms in its ring; b) a step of recovering the precipitate.

12 Claims, No Drawings

PROCESS FOR EXTRACTING COBALT FROM A SOLUTION COMPRISING, IN ADDITION TO COBALT, ONE OR MORE OTHER METAL ELEMENTS

CROSS-REFERENCE TO RELATED APPLICATIONS

This is a National Stage application of PCT international application PCT/FR2019/051483, filed on Jun. 18, 2019, which claims the priority of French Patent Application No. 1855348, filed Jun. 18, 2018, both of which are incorporated herein by reference in their entirety.

TECHNICAL FIELD

The present invention relates to a process for extracting the cobalt from a solution comprising, in addition to the cobalt, one or more other metal elements, said process allowing a selective extraction of the cobalt.

The invention is thus capable of being used in the field of processing and recycling of used materials comprising cobalt with a view to being able to reuse the latter.

PRIOR ART

Cobalt is an element in high demand since it is part of the composition of numerous materials and in particular:

- superalloys, which have a high mechanical strength and creep resistance at high temperatures and which are used for their properties in the manufacturing of mechanical parts, such as turbojets, turbines, rocket engines;
- the materials having a very high hardness and resistant to corrosion, such as the cemented carbides used to form mechanical parts resistant to wear such as the parts for machining metals, the parts for the extraction of ores or the cutting and the polishing of diamond;
- the pigments intended to be part of the composition of colored glass and colored ceramics;
- the catalysts used, in particular, in the oil industry and in the plastics industry;
- permanent magnets and magnetic media for recording; and
- the active materials for electrodes of lithium batteries.

Faced with the multitude of these uses and to be able to overcome the problems of supply and the progressive exhausting of the cobalt resources in the medium term, the question of the recovery of the cobalt from the used materials containing it is becoming a crucial question and has been the subject of active research in the field of separation chemistry. Thus, in *Material Letters* 167 (2016) 188-191, a process was proposed for recovering metal elements (including cobalt) from a solution simulating that which would come from the dissolution of a used electrode active material containing nickel, manganese and cobalt. More specifically, the recovery process explained in this document includes the following steps:

- a step of preparing the solution by placing an ($Ni(SO_4)$) ·$6H_2O$) nickel salt, an ($Mn(SO_4)·6H_2O$) manganese salt and a ($Co(SO_4)·6H_2O$) cobalt salt in contact in dimethylformamide;
- a step of adding to the resulting solution a 1,4-benzenedicarboxylic acid ligand (called BDC) or 1,3,5-benzenetricarboxylic acid (called BTC);
- a step of reaction in solvothermal conditions to form a coordination polymer between the ligand considered (reaction at 120° C. for the BDC and at 120° ° C. and 150° ° C. for the BTC) and the metal elements present in the solution;
- a step of centrifugation of the reaction medium;
- a step of recovering the supernatant and the precipitates;
- a step of analyzing the latter.

The BDC and the BTC result in a rate of recovery of the cobalt of 63% and a total recovery of the cobalt, respectively, but in both cases without any selectivity, since the products resulting from the reaction are always in a mixture with manganese and nickel in significant proportions. The cobalt thus recovered cannot therefore be reused as such since it is extracted in a significant proportion with the other metal elements present in the solution.

Thus, given that which already exists, the authors of the present invention set a goal of developing a process for extracting the cobalt from a solution containing it, this process having good selectivity with respect to cobalt, when the solution further comprises elements other than the latter.

DISCLOSURE OF THE INVENTION

Thus the invention relates to a process for selectively extracting the cobalt from a solution comprising cobalt and one or more other metal elements, said process comprising the following steps:

a) a step of forming a precipitate consisting of a coordination complex comprising cobalt by placing said solution in contact with at least one aromatic compound comprising at least one ring comprising at least two atoms of nitrogen;

b) a step of recovering the precipitate.

Before going into more detail in the description of the invention, the following definitions are specified.

Above and below, coordination complex means a compound comprising cobalt bonded to ligands (to be precise, in this case, the aromatic compound(s) comprising, in their ring, at least two atoms of nitrogen) via "coordination" bonds.

More specifically, the coordination complex can be a coordination polymer, which can be a metal-organic periodic assembly formed by iteration of metal centers (formed in this case by the element cobalt) connected to each other by molecules establishing coordination bonds with the metal centers (these molecules can be qualified as ligands and consist in this case of the aromatic compounds mentioned above). More specifically, in this case, the coordination polymer is formed by cobalt metal ions connected to each other via organic groups carried by the aromatic compounds mentioned above, these organic groups forming coordination bonds with the cobalt metal ions (which groups can be qualified as complexing groups). In addition to and instead of the term "coordination polymer", the term "metal-organic framework" (the abbreviation MOF also being used to designate this type of framework) can be used.

Via the implementation of the steps of the invention, an excellent extraction of the cobalt from a solution containing it and also an excellent selectivity of extraction of the cobalt, when the latter is present in the solution in the presence of one or more other metal elements, such as nickel and manganese, was observed.

Thus, the process comprises, first of all, a step a) of forming a precipitate consisting of a coordination complex, more specifically, a coordination polymer comprising cobalt by placing said solution in contact with at least one aromatic compound comprising, in its ring, at least two nitrogen atoms.

In the solution comprising cobalt, the latter is, conventionally, in the solution in cationic form. The solution comprising cobalt further comprises one or more other metal elements. For example, the other metal element(s) can be transition metal elements and even more specifically can be chosen from manganese, nickel, and the mixtures thereof. Even more specifically, the solution can, in addition to the cobalt, comprise, as metal elements, exclusively manganese, nickel, or mixtures thereof.

The compound(s) capable of forming at least one coordination bond with the cobalt are aromatic compounds comprising at least one ring comprising at least two nitrogen atoms.

They can be in particular:

- monocyclic aromatic five-membered compounds comprising two nitrogen atoms (in other words, diazole compounds);
- bicyclic aromatic compounds, one of the rings of which is a five-membered ring including two nitrogen atoms; or
- monocyclic aromatic six-membered compounds comprising two nitrogen atoms or three nitrogen atoms.

These compounds can also include one or more substituents (for example, an alkyl group) at the carbon atoms of the ring(s).

For the monocyclic aromatic five-membered compounds comprising two carbon atoms, particularly advantageous compounds are imidazole compounds, in particular those satisfying the following formulas (I) to (IV):

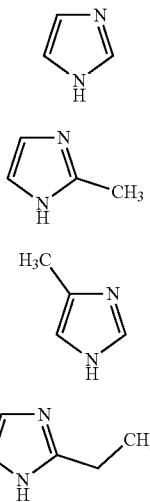

these compounds being respectively called imidazole (for the compound having the formula (I)), 2-methylimidazole (for the compound having the formula (II)), 4-methylimidazole (for the compound having the formula (III)) and 2-ethylimidazole (for the compound having the formula (IV)).

For the bicyclic aromatic compounds, one of the rings of which is a five-membered ring including two nitrogen atoms, particularly advantageous compounds are benzimidazole compounds, and in particular the compound satisfying the following formula (V):

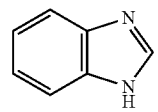

For the monocyclic aromatic six-membered compounds comprising two nitrogen atoms, particularly advantageous compounds can be those satisfying the following formulas (VI) to (VIII):

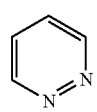

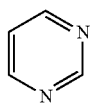

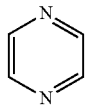

these compounds being called pyridazine (for the compound having the formula (VI)), pyrimidine (for the compound having the formula (VII)) and pyrazine (for the compound having the formula (VIII)).

For the monocyclic aromatic six-membered compounds comprising three nitrogen atoms, particularly advantageous compounds can be those satisfying the following formulas (IX) to (XI):

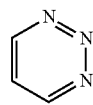

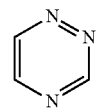

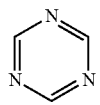

More specifically, when the solution, in addition to the cobalt, comprises, as other metal elements, manganese and nickel (or even comprises, as metal elements, exclusively cobalt, nickel and manganese), particularly effective aromatic compounds are imidazole (that is to say the compound having the aforementioned formula (I)), 2-methylimidazole (that is to say the compound having the aforementioned formula (II)), or the mixtures thereof.

The aromatic compound(s) used to form coordination complexes and more specifically coordination polymers with the cobalt in the context of the process of the invention are used in a quantity necessary to cause a precipitation in the solution into which they are added, and this quantity can be easily determined by a person skilled in the art either by carrying out previous trials or by spontaneous addition until the precipitation stops (this precipitation being an indicator of the formation of the coordination complex or polymer).

The solution comprising the cobalt and one or more other metal elements can further comprise at least one organic solvent, for example, from the family of the alcoholic solvents (such as methanol) or water.

The step of precipitation can be carried out with stirring and without applying heat (or, in other words, at ambient temperature).

Once the precipitation has been carried out, the precipitate formed is recovered for example by filtration.

The precipitate thus recovered can be subjected to a step of drying.

Moreover, before step a), the process of the invention can comprise a previous step of preparing the solution comprising cobalt and one or more other metal elements. When the process of the invention is part of the overall context of reprocessing or recycling of a solid used material comprising cobalt, for example, a material of the oxide ceramic type comprising cobalt, the previous step of preparing the solution can involve dissolving the solid used material comprising cobalt, for example, by placing it in contact with an acid solution, by means of which this results in a solution comprising cobalt, ready to be used for the implementation of steps a) and b) of the process of the invention.

After step b), a precipitate consisting of a coordination complex, more specifically, a coordination polymer comprising cobalt (in a very high majority proportion, given that the extraction is carried out selectively), is obtained.

Moreover, after step b), there can be a step of recovery, from the precipitate, of the aromatic compound(s) comprising at least two nitrogen atoms, and this recovery step can comprise the following operations:

an operation of solubilizing the precipitate thus recovered, for example in an acid solution;

an operation of precipitating or crystallizing the aromatic compound(s) comprising at least two nitrogen atoms, for example by cooling the solution coming from the solubilization operation;

an operation of recovering by filtration the aromatic compound(s) thus precipitated.

Moreover, the precipitate recovered after the process of the invention can be intended for various uses and, in particular, for:

the manufacturing of a simple oxide of cobalt, for example CoO, $Co_3O_4$;

the manufacturing of a mixed oxide of cobalt and of at least one other element, for example $LiCoO_2$, $LiNi_{1/3}Mn_{1/3}Co_{1/3}O_2$;

the manufacturing of a specific salt of cobalt.

Thus, the invention also relates to the following processes:

a process for manufacturing a simple oxide of cobalt comprising a step of implementing the process for extracting cobalt as defined above and a step of heat treatment by calcination of the precipitate coming from the extraction process;

a process for manufacturing a mixed oxide of cobalt and of at least one other metal element comprising a step of implementing the process for extracting cobalt as defined above and a step of heat treatment of the precipitate coming from the extraction process in the presence of a source of the other metal element(s);

a process for manufacturing a salt comprising a cobalt cation and an anion comprising a step of implementing the process for extracting cobalt as defined above and a step of dissolving the precipitate coming from the extraction process and a step of forming the salt by placing the solution coming from the dissolution in contact with the component anion of the salt;

alternatively, a process for manufacturing a salt comprising a cobalt cation and an anion comprising a step of implementing the process for extracting cobalt as defined above, a step of dissolving the precipitate coming from the extraction process, a step of recrystallizing and recovering by filtration the aromatic compound(s) comprising two nitrogen atoms and a step of forming the salt by placing the filtrate in contact with the component anion of the salt;

according to yet another alternative, a process for manufacturing a salt comprising a cobalt cation and an anion comprising a step of implementing the process for extracting cobalt as defined above, a step of dissolving the precipitate coming from the extraction process, a step of precipitating the cobalt cation, a step of recovering by filtration the precipitate thus formed, by means of which the filtrate is a filtrate comprising the aforementioned aromatic compound(s).

With regard to the process for manufacturing a simple oxide of cobalt, the step of heat treatment by calcination of the precipitate can involve heating the precipitate under an oxygen atmosphere with a temperature and a duration suitable for forming the oxide, and this temperature and duration can be easily determined by a person skilled in the art by previous trials involving determining according to the desired phase (the latter being detectable by X-ray diffraction) the suitable temperature and duration pair.

With regard to the process for manufacturing a mixed oxide of cobalt and of at least one other metal element, the source of the other metal element(s) can be a salt, for example a carbonate salt (more specifically, a lithium carbonate when the element is lithium, a manganese carbonate when the element is manganese, and a nickel carbonate when the element is nickel). The step of heat treatment of the precursor in the presence of the source of the other element(s) can involve heating the precipitate under an oxygen atmosphere with a suitable temperature and duration by a person skilled in the art by previous trials in the same way as the process for manufacturing a simple oxide.

With regard to the process of manufacturing a salt comprising a cobalt cation and an anion, the dissolution step can be carried out by placing the precipitate in contact with a solubilization solution (for example, an acid aqueous solution) and the step of precipitating the cobalt in the form of a new salt can be carried out by placing the solution obtained after the dissolution step in contact with a salt including the anion intended to enter into the composition of the desired cobalt salt.

The invention will now be described with respect to the following examples given for illustrative and non-limiting purposes.

DETAILED DISCLOSURE OF SPECIFIC EMBODIMENTS

Example 1

This example illustrates the implementation of the process of the invention at ambient temperature by using 2-methylimidazole as the aromatic compound.

To do this, a model solution is prepared by dissolving 4.369 g of cobalt nitrate, 4.322 g of nickel nitrate and 3.846 g of manganese nitrate in 600 mL of methanol, the final solution obtained being equimolar since it contains as many moles of cobalt, moles of nickel as moles of manganese.

The model solution is then introduced into a reactor stirred at 200 rpm at ambient temperature.

In parallel, in a beaker, 29.5806 g of 2-methylimidazole are dissolved in 400 ml of methanol.

The solution contained in the beaker is added into the reactor maintained with stirring. The mixture is then left for one night with stirring and at ambient temperature. The next day, the solution is filtered on a Büchner filter and a violet powder is obtained. This powder is then left to dry in an oven for one night at 60° C.

The powder is then analyzed by X-ray diffraction, from which it was able to be deduced that the material obtained satisfies the following formula: $Co(C_4H_5N_2)_2$ and has a structure of the zeolitic imidazolate type.

The powder was also analyzed by inductively coupled plasma atomic emission spectroscopy (ICP-AES), which allowed to demonstrate that the cobalt selectively reacted with the 2-méthylimidazole since the ratio of the molar percentages of elements in the powder shows that the molar percentage of cobalt is greater than 90% (more specifically 93% for cobalt, 2% for nickel and 6% for manganese). In other words, for 100 g of powder recovered, 22.77 g correspond to cobalt, 0.381 g to nickel and 1.26 g to manganese.

Example 2

This example illustrates the implementation of the process of the invention at 75° C. by using imidazole as the aromatic compound.

To do this, a model solution is prepared by dissolving 4.369 g of cobalt nitrate, 4.322 g of nickel nitrate and 3.846 g of manganese nitrate in 300 ml of methanol, the final solution obtained being equimolar since it contains as many moles of cobalt, moles of nickel as moles of manganese.

The model solution is introduced into the Teflon jacket of an autoclave having a 1-liter volume.

In parallel, in a beaker, 24.529 g of imidazole are dissolved in 200 ml of methanol.

The solution contained in the beaker is added into the Teflon jacket of the autoclave with the solution containing the cations. The autoclave is then closed and placed into an oven at 75° C. for two days. The solution is then filtered on a Büchner filter and a violet powder is obtained. This powder is then placed to dry in an oven at 60° C. for one night after having been rinsed with ethanol.

The powder was analyzed by inductively coupled plasma atomic emission spectroscopy (ICP-AES), which allowed to demonstrate that the cobalt selectively reacted with the imidazole since the ratio of the molar percentages of elements in the powder shows that the molar percentage of cobalt is greater than 90% (more specifically 96% for cobalt, 2.2% for nickel and 1.8% for manganese). In other words, for 100 g of powder recovered, 22.71 g correspond to cobalt, 0.53 g corresponding to nickel and 0.41 g to manganese.

What is claimed is:

1. A process for selective extraction of cobalt from a solution comprising cobalt and one or more other metal elements, said process comprising the following steps:
    a) forming a precipitate consisting of a coordination complex comprising cobalt, said precipitate being formed by placing said solution in contact with at least one imidazole compounds; and
    b) recovering the precipitate.

2. The process according to claim 1, wherein the coordination complex is a coordination polymer.

3. The process according to claim 1, wherein the other metal element(s) are transition metal elements.

4. The process according to claim 3, wherein the other metal element(s) are chosen from nickel, manganese, and the mixtures thereof.

5. The process according to claim 1, wherein the at least one imidazole compounds include one or more substituents at the carbon atoms of the ring.

6. The process according to claim 1, wherein the at least one imidazole compounds satisfy at least one of the following formulas (I) to (IV):

(I)

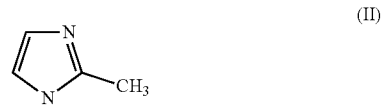

(II)

(III)

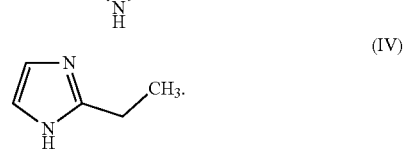

(IV)

7. The process according to claim 5, wherein the substituent is an alkyl group.

8. The process according to claim 1, wherein the step of precipitation is carried out with stirring and without applying heat.

9. The process according to claim 1, wherein, when the solution, in addition to the cobalt, comprises, as other metal element(s), manganese, nickel, and mixtures thereof, the aromatic compound(s) are chosen from imidazole, 2-methylimidazole, and the mixtures thereof.

10. The process according to claim 1, further comprising, before step a), a previous step of preparing the solution comprising cobalt and one or more other metal elements.

11. The process according to claim 1, further comprising, after step b), a step of recovery, from the precipitate, of the at least one imidazole compounds comprising at least two nitrogen atoms.

12. The process according to claim 11, wherein the step of recovery comprises the following operations:
    an operation of solubilizing the precipitate thus recovered;
    an operation of precipitating or crystallizing the aromatic compound(s) comprising at least two nitrogen atoms;
    an operation of recovering by filtration the aromatic compound(s) thus precipitated.

* * * * *